(12) United States Patent
Fujitake

(10) Patent No.: US 9,013,142 B2
(45) Date of Patent: Apr. 21, 2015

(54) CHARGING CONNECTOR AND CHARGING CABLE UNIT

(75) Inventor: Yoshinori Fujitake, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 701 days.

(21) Appl. No.: 13/201,367

(22) PCT Filed: Apr. 27, 2009

(86) PCT No.: PCT/JP2009/058241
§ 371 (c)(1),
(2), (4) Date: Aug. 12, 2011

(87) PCT Pub. No.: WO2010/125625
PCT Pub. Date: Nov. 4, 2010

(65) Prior Publication Data
US 2011/0291612 A1     Dec. 1, 2011

(51) Int. Cl.
*H02J 7/00* (2006.01)
*B60L 3/00* (2006.01)
(Continued)

(52) U.S. Cl.
CPC ............. *B60L 3/0069* (2013.01); *B60K 1/02* (2013.01); *B60K 6/365* (2013.01); *B60K 6/445* (2013.01); *B60L 3/04* (2013.01); *B60L 7/14* (2013.01); *B60L 11/123* (2013.01); *B60L 11/14* (2013.01); *B60L 11/1812* (2013.01); *B60L 11/1818* (2013.01); *B60L 11/1838* (2013.01); *B60L 15/007* (2013.01); *B60L 2220/14* (2013.01); *Y02T 10/6217* (2013.01); *Y02T 10/6239* (2013.01); *Y02T 10/6269* (2013.01); *Y02T 10/7005* (2013.01); *Y02T 10/7077* (2013.01); *Y02T 10/7088* (2013.01); *Y02T 90/121* (2013.01); *Y02T 90/127* (2013.01);
(Continued)

(58) Field of Classification Search
USPC .................................................. 320/107, 109
See application file for complete search history.

(56) References Cited

U.S. PATENT DOCUMENTS 5,536,173 A * 7/1996 Fujitani et al. .................. 439/34
5,751,135 A * 5/1998 Fukushima et al. .......... 320/107
(Continued)

FOREIGN PATENT DOCUMENTS

JP    A-06-290836    10/1994
JP    A-09-161898    6/1997
(Continued)

OTHER PUBLICATIONS

International Search Report issued in International Application No. PCT/JP2009/058241 dated Jun. 23, 2009.

*Primary Examiner* — Drew A Dunn
*Assistant Examiner* — Nathaniel Pelton
(74) *Attorney, Agent, or Firm* — Oliff PLC

(57) ABSTRACT

A vehicle and a power source are connected to each other at the time of charging by a charging cable including a signal line for transmitting a pilot signal for communication of information and a power line for transmitting electric power. The pilot signal has voltage changeable between a high level and a low level having a lower potential than the high level. The charging connector is provided with a power terminal to be supplied with the electric power from the power line, a signal terminal receiving the pilot signal transmitted from the signal line, and a light emitting diode having one end coupled to a signal of the signal line and the other end coupled to a node of a higher potential than the low level, with the forward direction thereof from the other end to the one end.

14 Claims, 8 Drawing Sheets

(51) Int. Cl.
   *B60K 6/365*    (2007.10)
   *B60K 6/445*    (2007.10)
   *B60L 3/04*     (2006.01)
   *B60L 7/14*     (2006.01)
   *B60L 11/12*    (2006.01)
   *B60L 11/14*    (2006.01)
   *B60L 11/18*    (2006.01)
   *B60L 15/00*    (2006.01)
   *B60K 1/02*     (2006.01)

(52) U.S. Cl.
   CPC ............... *Y02T 90/128* (2013.01); *Y02T 90/14* (2013.01); *Y02T 90/16* (2013.01); *Y02T 90/163* (2013.01)

(56) References Cited

U.S. PATENT DOCUMENTS 6,275,011 B1 * 8/2001 Yang ............................ 320/150
2008/0100259 A1 * 5/2008 Tabatowski-Bush ......... 320/104

FOREIGN PATENT DOCUMENTS

| JP | A-2009-071989 | 4/2009 |
| JP | A-2010-123284 | 6/2010 |

* cited by examiner

FIG.8
| VOLTAGE | EXAMPLE OF CPLT VOLTAGE DETECTED BY VOLTAGE SENSOR 604 | ACTION OF OSCILLATOR |
|---|---|---|
| V1 | 12V±0.6V | NON (INITIAL STAGE) |
| V2 | 9V±1V | CPLT OSCILLATION |
| V3 | 6V±1V | RELAY ON |
FIG.9
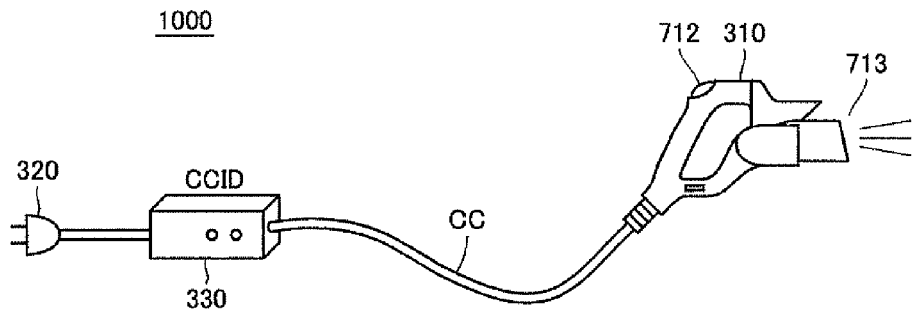
FIG.10
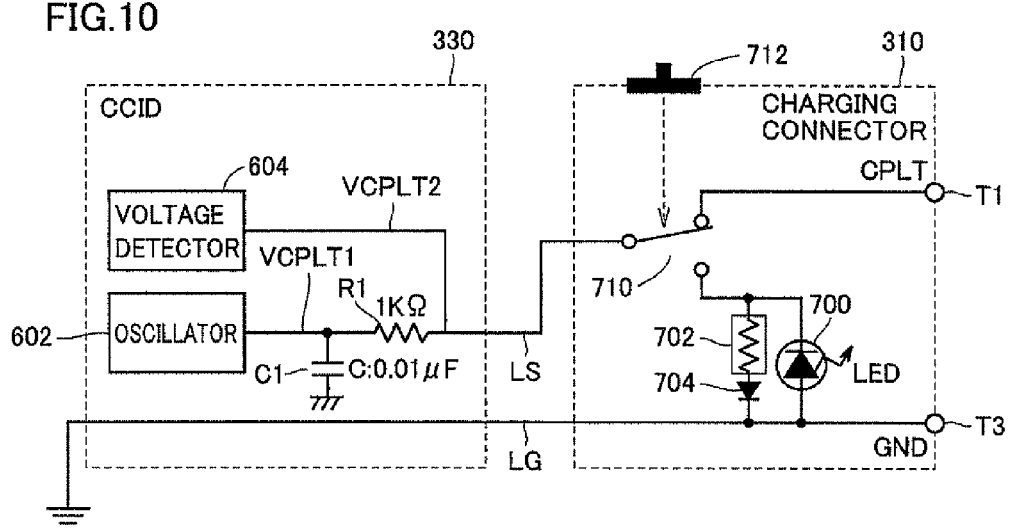

CHARGING CONNECTOR AND CHARGING CABLE UNIT

TECHNICAL FIELD

This invention relates to a charging connector and a charging cable unit, and particularly to a charging connector and a charging cable unit providing connection between a vehicle and a power source outside of the vehicle for charging a power storage device equipped in the vehicle.

BACKGROUND ART

Vehicles such as an electric automobile, a hybrid vehicle, and a fuel cell vehicle recently draws public attention as eco-friendly vehicles. The vehicle is equipped with an electric motor for generating traveling drive force, and a power storage device for storing electric power to be supplied to the electric motor. The hybrid vehicle is a vehicle further equipped with an internal combustion engine as a mechanical power source in addition to the electric motor, and the fuel cell vehicle is a vehicle equipped with a fuel cell as a DC power source for driving the vehicle.

With regard to such a vehicle, there is a known vehicle having a power storage device equipped in the vehicle for driving the vehicle so as to be chargeable from a power source for household use. For example, a power supply receptacle provided in a building and a charging inlet provided in the vehicle are connected to each other by a charging cable so as to supply the electric power from the power source for household use to the power storage device. Hereinafter, it should be noted that the vehicle having the power storage device equipped in the vehicle so as to be chargeable from the power source outside of the vehicle is also referred to as a "plug-in vehicle". The standards on such a plug-in vehicle have already been set in the United States and Japan.

However, when such a plug-in vehicle is charged at night, a connector for charging is not easily connected to the charging inlet as it is dark to see the charging inlet of the vehicle. Thus, Japanese Patent Laying-Open No. 06-290836 (Patent Document 1) discloses a technique of providing a light in a charging connector.

PRIOR ART DOCUMENTS

Patent Documents

Patent Document 1: Japanese Patent Laying-Open No. 06-290836

SUMMARY OF THE INVENTION

Problems to be Solved by the Invention

In the technique disclosed in Japanese Patent Laying-Open No. 06-290836, a cell battery is adapted as a power source for the light provided in the connector. However, when the cell battery is exhausted, there is a need for replacing the cell battery. It is assumed that the cell battery is replaced when one turns the light on at night but realizes that the cell battery is exhausted. The cell battery is not easily replaced in the dark at night. Although a power supply circuit for generating power supply voltage for the light from the supplied electric power may be built in the charging connector so as not to require the replacement of the cell battery, size of circuits to be accommodated in the charging connector is increased.

In a case where a load except for the light is driven by the charging connector, there is a problem of how to ensure a power source thereof.

Although a light emitting diode may be adapted as the light, there is a need for improving a circuit for turning the light emitting diode on in order to effectively use the ensured power source for the light.

An object of this invention is to provide a charging connector and a charging cable unit capable of effectively driving a load in a simple configuration without maintenance.

Means for Solving the Problems

To sum up, this invention is a charging connector providing connection between a vehicle and a power source outside of the vehicle for charging a power storage device equipped in the vehicle, the vehicle and the power source being connected to each other at the time of charging by a charging cable including a signal line for transmitting a pilot signal for communication of information and a power line for transmitting electric power. The pilot signal has voltage changeable between a high level and a low level having a lower potential than the high level. The charging connector is provided with a power terminal to be supplied with the electric power from the power line, a signal terminal receiving the pilot signal transmitted from the signal line, and a load having one end coupled to a signal of the signal line and the other end coupled to a node of a higher potential than the low level, and including a rectifier element with the forward direction from the other end to the one end.

Preferably, the load is provided in the connector, serving as a light for illuminating a connection portion provided on the vehicle. The rectifier element is a light emitting diode.

More preferably, the charging connector is further provided with an operation unit for operating a lock between the charging connector and the connection portion provided on the vehicle, and a switch for connecting the signal line and the load in accordance with the operation of the operation unit. The operation unit is operable in a lock state and a release state. The switch connects the signal line and the load in the release state, and electrically separates the load from the signal line in the lock state.

According to another aspect, this invention is a charging cable unit providing connection between a vehicle and a power source outside of the vehicle for charging a power storage device equipped in the vehicle, provided with a charging cable including a signal line for transmitting a pilot signal for communication of information and a power line for transmitting electric power, the charging cable providing connection between the vehicle and the power source at the time of charging. The pilot signal has voltage changeable between a high level and a low level serving as lower potential than the high level. The charging cable unit is further provided with a charging connector connected to one end of the charging cable, the charging connector being connectable to a connection portion provided on the vehicle. The charging connector includes a power terminal to be supplied with the electric power from the power line, a signal terminal receiving the pilot signal transmitted from the signal line, and a load having one end coupled to a signal of the signal line and the other end coupled to a node of a higher potential than the low level, and including a rectifier element with the forward direction thereof from the other end to the one end.

Preferably, the load is provided in the connector, serving as a light for illuminating the connection portion provided on the vehicle, and the rectifier element is a light emitting diode.

More preferably, the charging cable unit is further provided with a connection unit to be connected to the power source outside of the vehicle, and a breaker provided between the connection unit and the charging connector and connected to the charging cable in series.

More preferably, the breaker includes a signal generating circuit generating the pilot signal, a first resistor element connected between the output side of the signal generating circuit and the signal line, and a voltage detector for detecting a potential of the high level of the signal line. The charging connector further includes a second resistor element connected in parallel to the load, an operation unit for operating a lock between the charging connector and the connection portion provided on the vehicle, and a switch for connecting the signal line and the load and the second resistor element connected in parallel in accordance with the operation of the operation unit. The operation unit is operable in a lock state and a release state. The switch connects the signal line and the load in the release state, and electrically separates the load from the signal line in the lock state.

Effects of the Invention

According to the present invention, the load built in the charging connector such as the light can be highly efficiently used by the ensured power source.

BRIEF DESCRIPTION OF THE DRAWINGS

FIG. 8 is a table for illustrating an action of an oscillator 602.

FIG. 9 is a schematic view showing an outer appearance of a charging cable unit 1000 of the present embodiment.

FIG. 10 is a circuit diagram showing a configuration of a charging connector 310 of FIG. 9. FIG. 10 also briefly shows a configuration of a CUD 330 for generating pilot signal CPLT for illustration.

MODES FOR CARRYING OUT THE INVENTION

Figure 1:
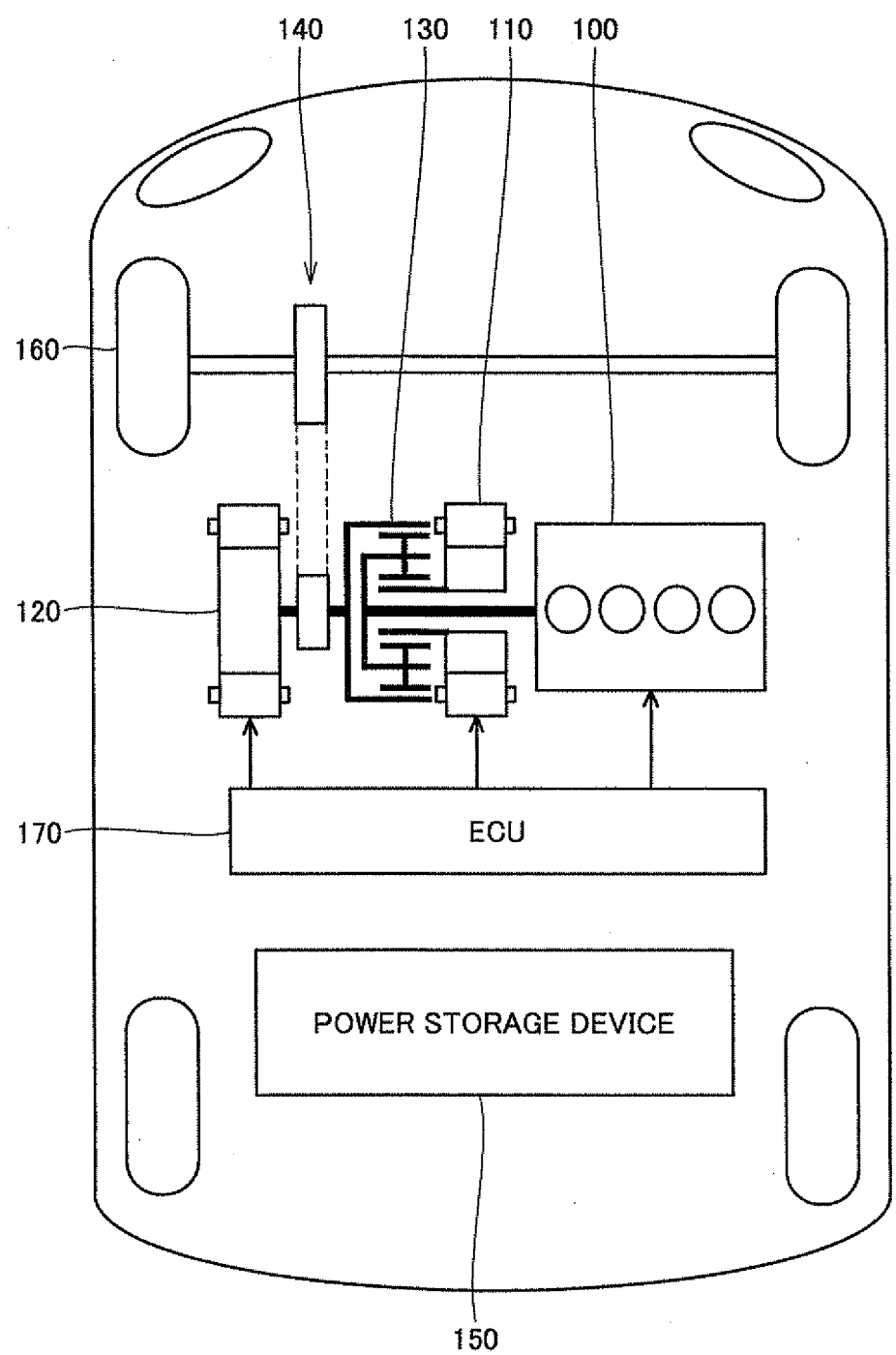
FIG. 1 is an entire block diagram of a plug-in hybrid vehicle shown as an example of a vehicle applying a charging controller according to an embodiment of this invention.

Hereinafter, an embodiment of the present invention will be described in detail with reference to the drawings. It should be noted that like parts or corresponding parts in the drawings are given like reference numerals and description of the parts will not be repeated.

[Entire Configuration of Plug-in Hybrid Vehicle]

FIG. 1 is an entire block diagram of a plug-in hybrid vehicle shown as an example of a vehicle applying a charging controller according to the embodiment of this invention.

With reference to FIG. 1, this plug-in hybrid vehicle is provided with an engine 100, a first MG (Motor Generator) 110, a second MG 120, a power split device 130, a speed reducer 140, a power storage device 150, drive wheels 160, and an ECU 170.

Engine 100, first MG 110, and second MG 120 are coupled to power split device 130. This plug-in hybrid vehicle travels by drive force from at least one of engine 100 and second MG 120. Mechanical power generated by engine 100 is split into two routes by power split device 130. That is, one of the routes is a route to be transmitted to drive wheels 160 via speed reducer 140, and the other is a route to be transmitted to first MG 110.

First MG 110 is an AC rotating electric machine, for example a three-phase synchronous electric motor provided with a U-phase coil, a V-phase coil, and a W-phase coil. First MG 110 generates electric power with using the mechanical power of engine 100 split by power split device 130. For example, when a charging state (hereinafter, also referred to as the "SOC (State Of Charge)") of power storage device 150 is decreased below a preliminarily fixed value, engine 100 is started up and first MG 110 generates the electric power. The electric power generated by first MG 110 is converted from AC to DC by an inverter (will be described later), voltage thereof is regulated by a converter (will be described later), and the electric power is stored in power storage device 150.

Second MG 120 is an AC rotating electric machine, for example a three-phase synchronous electric motor provided with a U-phase coil, a V-phase coil, and a W-phase coil. Second MG 120 generates the drive force with using at least one of the electric power stored in power storage device 150 and the electric power generated by first MG 110. The drive force of second MG 120 is transmitted to drive wheels 160 via speed reducer 140. Thereby, second MG 120 assists engine 100, and the vehicle travels by the drive force from second MG 120. It should be noted that although drive wheels 160 serve as front wheels in FIG. 1, instead of the front wheels, or together with the front wheels, rear wheels may be driven by second MG 120.

It should be noted that second MG 120 is driven by drive wheels 160 via speed reducer 140 at the time of braking of the vehicle for example, and second MG 120 is actuated as a power generator. Thereby, second MG 120 is actuated as a regenerative brake for converting braking energy into the electric power. The electric power generated by second MG 120 is stored in power storage device 150.

Power split device 130 includes a planetary gear having a sun gear, a pinion gear, a carrier, and a ring gear. The pinion gear is engaged with the sun gear and the ring gear. The carrier supports the pinion gear so that the pinion gear can rotate on its own axis, and is coupled to a crankshaft of engine 100. The sun gear is coupled to a rotation shaft of first MG 110. The ring gear is coupled to a rotation shaft of second MG 120 and speed reducer 140.

Figure 2:
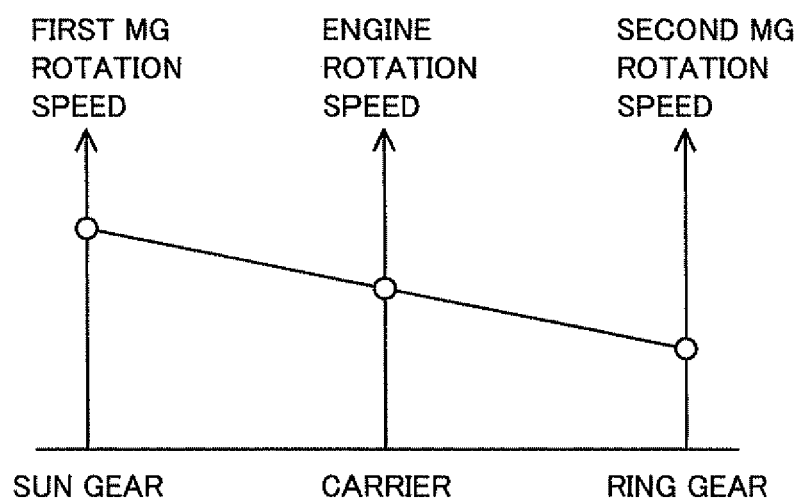
FIG. 2 is a nomographic chart for illustrating an operation of a power split device 130.

FIG. 2 is a nomographic chart for illustrating an operation of power split device 130.

As shown in FIG. 2, engine 100, first MG 110, and second MG 120 are coupled via power split device 130 formed by the planetary gear, so that the rotation speeds of engine 100, first MG 110, and second MG 120 are in a relationship connected by a straight line in the nomographic chart.

With reference to FIG. 1 again, power storage device 150 is a DC power source capable of being charged and discharged, and for example made of a nickel-metal hydride secondary battery, a lithium-ion secondary battery or the like. Voltage of power storage device 150 is about 200 V for example. Power storage device 150 stores the electric power generated by first MG 110 and second MG 120, and in addition, the electric power supplied from a power source outside of the vehicle as described later. It should be noted that a high capacity capacitor can be adapted as power storage device 150. Any electric buffer capable of temporarily storing the electric power generated by first MG 110 and second MG 120 and the electric power from the power source outside of the vehicle and supplying the stored electric power to second MG 120 can be adapted as power storage device 150.

Engine 100, first MG 110, and second MG 120 are controlled by ECU 170. It should be noted that ECU 170 may be divided into a plurality of ECUs respectively serving several functions such as engine control, motor control, and voltage control.

Figure 3:
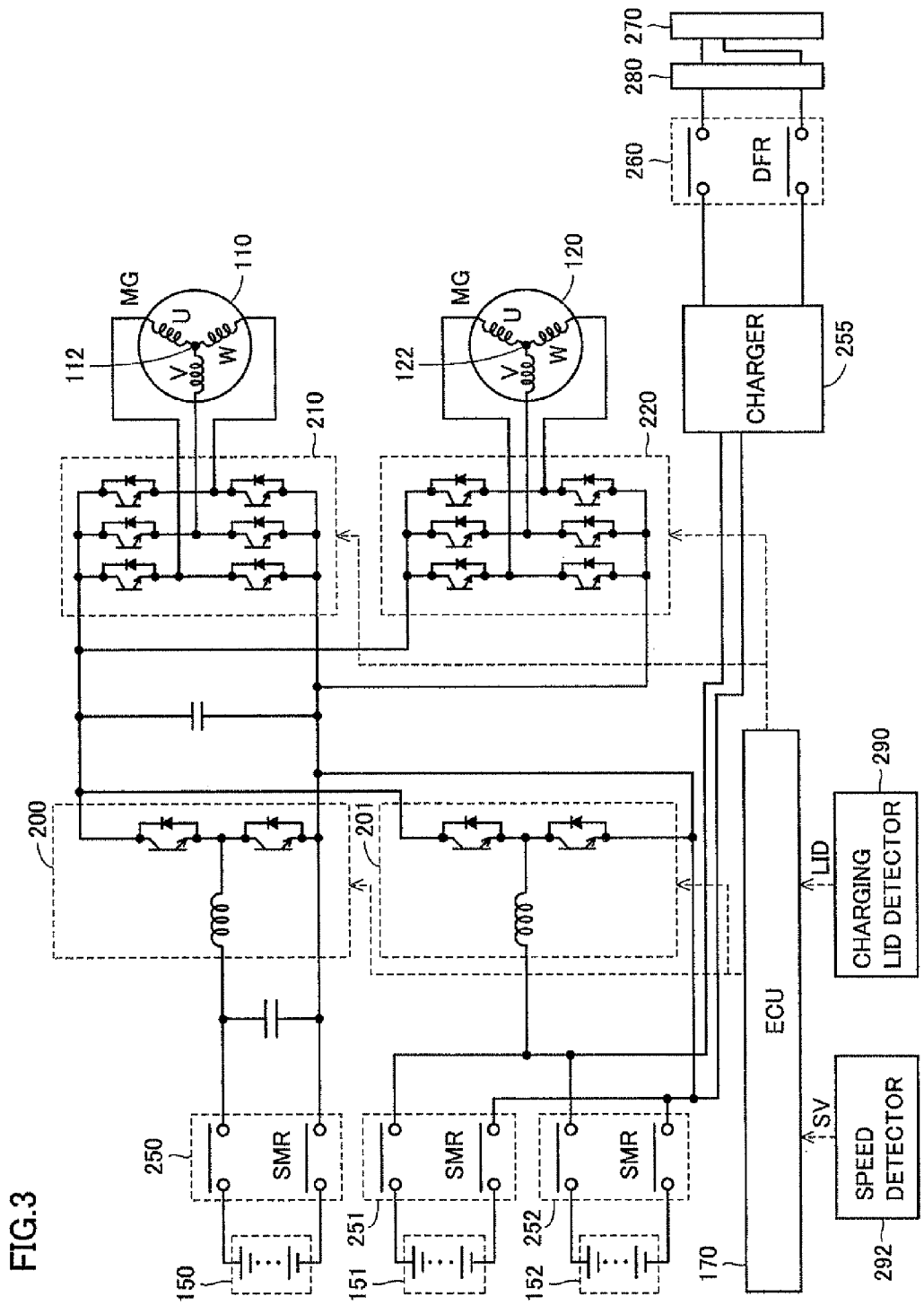
FIG. 3 is an entire configuration diagram of an electric system of the plug-in hybrid vehicle shown in FIG. 1.

FIG. 3 is an entire configuration diagram of an electric system of the plug-in hybrid vehicle shown in FIG. 1.

With reference to FIG. 3, this electric system is provided with power storage devices 150 to 152, SMRs (System Main Relays) 250 to 252, converters 200 and 201, an inverter 210, an inverter 220, first MG 110, second MG 120, a DFR (Dead Front Relay) 260, a LC filter 280, a charging inlet 270, a charging lid detector 290, and a speed detector 292.

SMR 250 is provided between power storage device 150 and converter 200. SMR 250 is a relay for electrically connecting/blocking power storage device 150 and the electric system, and ECU 170 controls turning ON/OFF of SMR 250. That is, SMR 250 is turned ON at the time of vehicle traveling and at the time of charging power storage device 150 from the power source outside of the vehicle, and power storage device 150 is electrically connected to the electric system. Meanwhile, SMR 250 is turned OFF at the time of stopping the vehicle system, and power storage device 150 is electrically blocked from the electric system.

Converter 200 includes a reactor, two NPN transistors, and two diodes. The reactor has one end connected to the positive electrode side of power storage device 150, and the other end connected to a connection node of the two NPN transistors. The two NPN transistors are connected in series, and the diodes are respectively connected to the NPN transistors in anti-parallel.

It should be noted that for example IGBTs (Insulated Gate Bipolar Transistors) can be used as the NPN transistors. Power switching elements such as power MOSFETs (Metal Oxide Semiconductor Field-Effect Transistors) may be used instead of the NPN transistors.

When the electric power is supplied from power storage device 150 to first MG 110 or second MG 120, convertor 200 boosts the voltage of the electric power discharged from power storage device 150 based on a control signal from ECU 170, and supplies the power to first MG 110 or second MG 120. When charging power storage device 150, converter 200 steps down the voltage of the electric power supplied from first MG 110 or second MG 120, and outputs the power to power storage device 150.

SMR 251 is provided between power storage device 151 and converter 201, and SMR 252 is provided between power storage device 152 and converter 201. SMRs 251 and 252 are relays for electrically connecting/blocking power storage devices 151 and 152 and the electric system, respectively, and ECU 170 controls turning ON/OFF of SMRs 251 and 252.

In other words, only one of SMRs 251 and 252 is turned ON at the time of vehicle traveling and at the time of charging power storage device 150 from the power source outside of the vehicle. Converter 201 converts the voltage between the voltage of one of power storage devices 151 and 152 selected by SMRs 251 and 252 and the voltage given from converter 202 to inverters 210 and 220. Meanwhile, SMRs 250 to 252 are all turned OFF at the time of stopping the vehicle system, and power storage devices 150 to 152 are electrically blocked from the electric system.

Converter 200 includes a reactor, two NPN transistors, and two diodes. The reactor has one end connected to the positive electrode side of power storage device 150, and the other end connected to a connection node of the two NPN transistors. The two NPN transistors are connected in series, and the diodes are respectively connected to the NPN transistors in anti-parallel. Converter 201 has the same configuration as converter 200, and description thereof will not be repeated.

It should be noted that for example IGBTs (Insulated Gate Bipolar Transistors) can be used as the NPN transistors. Power switching elements such as power MOSFETs (Metal Oxide Semiconductor Field-Effect Transistors) may be used instead of the NPN transistors.

Inverter 210 includes a U-phase arm, a V-phase arm, and a W-phase arm. The U-phase arm, the V-phase arm, and the W-phase arm are connected to each other in parallel. Each of the phase arms includes two NPN transistors connected in series, and diodes are respectively connected to the NPN transistors in anti-parallel. A connection point of the two NPN transistors in each of the phase arms is connected to an end of the corresponding coil in first MG 110 but not a neutral point 112 on the other end of the coil.

Inverter 210 converts the DC electric power supplied from converter 200 into the AC electric power, and supplies the power to first MG 110. Inverter 210 converts the AC electric power generated by first MG 110 into the DC electric power, and supplies the power to converter 200.

Inverter 220 also has the same configuration as inverter 210. A connection point of two NPN transistors in each of phase arms is connected to an end of the corresponding coil in second MG 120 but not a neutral point 122 on the other end of the coil.

Inverter 220 converts the DC electric power supplied from converter 200 into the AC electric power, and supplies the power to second MG 120. Inverter 220 converts the AC electric power generated by second MG 120 into the DC electric power, and supplies the power to converter 200.

Further, when power storage devices 150 to 152 are charged from the power source outside of the vehicle, a charger 255 converts the AC electric power given from the power source outside of the vehicle into the DC electric power based on a control signal from ECU 170, and supplies the converted DC electric power to a power line pair between converter 201 and SMRs 251 and 252.

DFR 260 is provided between a power line pair between converter 201 and SMRs 251 and 252 and a power line pair connected to LC filter 280. DFR 260 is a relay for electrically connecting/blocking charging inlet 270 and the electric system, and ECU 170 controls turning ON/OFF of DFR 260. That is, DFR 260 is turned OFF at the time of vehicle traveling, and the electric system and charging inlet 270 are electrically separated from each other. Meanwhile, DFR 260 is turned ON at the time of charging power storage device 150 from the power source outside of the vehicle, and charging inlet 270 is electrically connected to the electric system.

LC filter 280 is provided between DFR 260 and charging inlet 270, for preventing an output of high-frequency noise from the electric system of the plug-in hybrid vehicle to the power source outside of the vehicle at the time of charging power storage device 150 from the power source outside of the vehicle.

Charging inlet 270 is a power interface for receiving the charging electric power from the power source outside of the vehicle. At the time of charging power storage device 150 from the power source outside of the vehicle, a connector of a charging cable for supplying the electric power from the power source outside of the vehicle to the vehicle is connected to charging inlet 270.

ECU 170 generates the control signals for driving SMR 250, converter 200, inverter 210, and inverter 220 so as to control actions of the units above.

Charging lid detector 290 detects an open/close state of a cover (a charging lid) of an open unit where charging inlet 270 is accommodated, and outputs a lid signal LID indicating the open/close state to ECU 170. Speed detector 292 detects vehicle speed SV of this plug-in hybrid vehicle, and outputs a detected value thereof to ECU 170.

Figure 4:
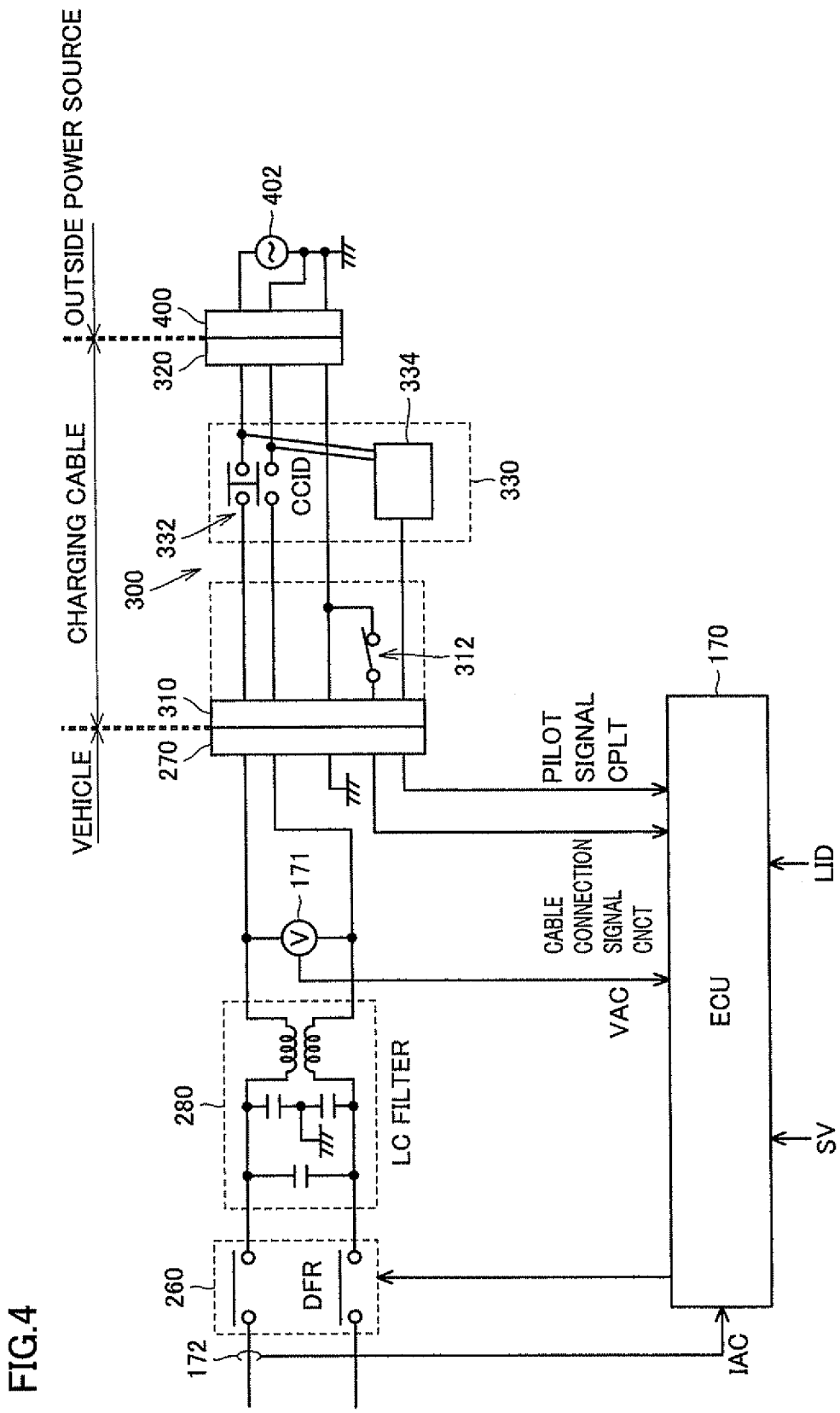
FIG. 4 is a schematic configuration diagram of a part regarding a charging mechanism of the electric system shown in FIG. 3.

FIG. 4 is a schematic configuration diagram of a part regarding a charging mechanism of the electric system shown in FIG. 3. With reference to FIG. 4, a charging cable 300 coupling the plug-in hybrid vehicle and the power source outside of the vehicle includes a charging connector 310, a plug 320, and a COD (Charging Circuit Interrupt Device) 330.

Charging connector 310 is connectable to charging inlet 270 provided on the vehicle. Charging connector 310 is provided with a limit switch 312. When charging connector 310 is connected to charging inlet 270, limit switch 312 is actuated and a cable connection signal CNCT indicating that charging connector 310 is connected to charging inlet 270 is inputted to ECU 170.

Plug 320 is connected to a power supply receptacle 400 provided in a building for example. The AC electric power is supplied from a power source 402 (such as a system power source) to power supply receptacle 400.

CCID 330 includes a relay 332 and a control pilot circuit 334. Relay 332 is provided in a power line pair for supplying the charging electric power from power source 402 to the plug-in hybrid vehicle. Control pilot circuit 334 controls turning ON/OFF of relay 332. When relay 332 is turned OFF, an electric path for supplying the electric power from power source 402 to the plug-in hybrid vehicle is blocked. Meanwhile, when relay 332 is turned ON, the electric power can be supplied from power source 402 to the plug-in hybrid vehicle.

When plug 320 is connected to power supply receptacle 400, control pilot circuit 334 is actuated by the electric power supplied from power source 402. Control pilot circuit 334 generates a pilot signal CPLT to be transmitted to ECU 170 of the vehicle via a control pilot line. When charging connector 310 is connected to charging inlet 270 and a potential of pilot signal CPLT is decreased to a specified value, control pilot circuit 334 oscillates pilot signal CPLT by a specified duty cycle (the proportion of pulse width relative to an oscillation cycle).

This duty cycle is set based on a rated current suppliable from power source 402 to the vehicle via charging cable 300.

Figure 5:
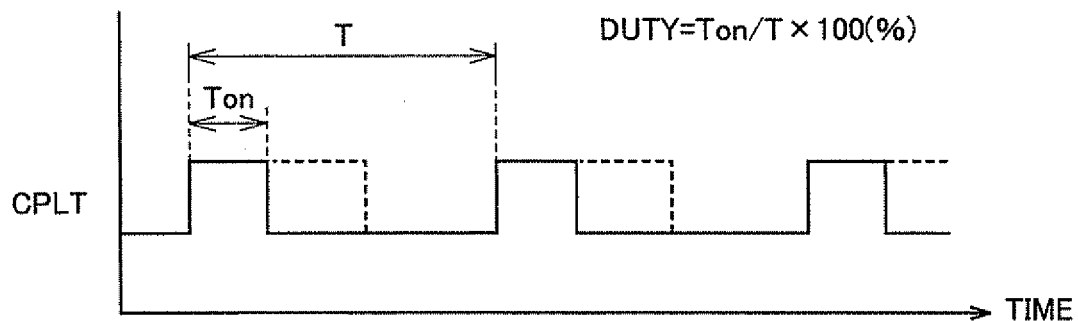
FIG. 5 is a chart showing a waveform of a pilot signal CPLT generated by a control pilot circuit 334 shown in FIG. 4.

FIG. 5 is a chart showing a waveform of pilot signal CPLT generated by control pilot circuit 334 shown in FIG. 4.

With reference to FIG. 5, pilot signal CPLT is periodically changeable by a specific cycle T. Pulse width Ton of pilot signal CPLT is set based on the rated current suppliable from power source 402 to the vehicle via charging cable 300. The rated current is notified from control pilot circuit 334 to ECU 170 of the vehicle with using pilot signal CPLT by the duty cycle serving as the proportion of pulse width Ton relative to cycle T.

It should be noted that the rated current is determined for each charging cable, The rated current is differentiated in accordance with a type of the charging cable, and hence the duty cycle of pilot signal CPLT is also differentiated. ECU 170 of the vehicle receives pilot signal CPLT transmitted from control pilot circuit 334 provided in charging cable 300 via the control pilot line, and detects the duty cycle of received pilot signal CPLT so as to detect the rated current suppliable from power source 402 to the vehicle via charging cable 300.

Figure 6:
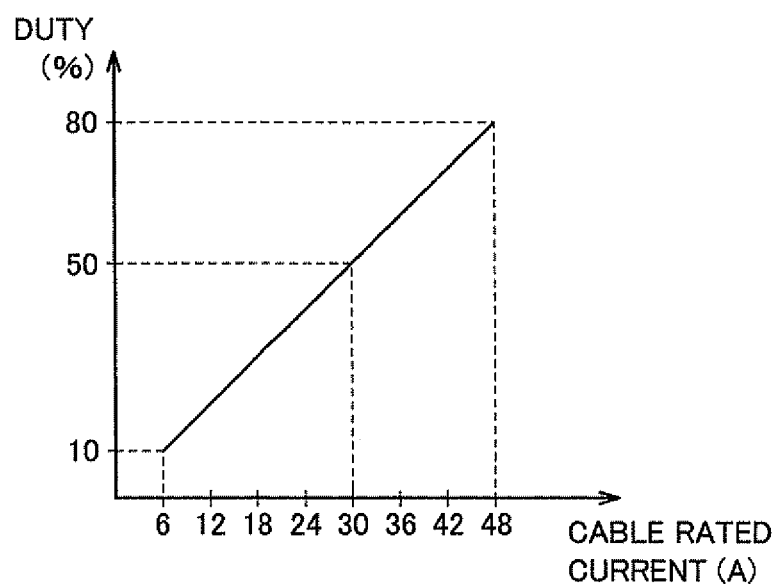
FIG. 6 is a chart showing a relationship between a duty cycle of pilot signal CPLT shown in FIG. 5 and a cable rated current.

FIG. 6 is a chart showing a relationship between the duty cycle of pilot signal CPLT shown in FIG. 5 and a cable rated current.

With reference to FIG. 6, the horizontal axis indicates the cable rated current, and the vertical axis indicates the duty cycle (%). For example, in a case where the cable rated current is 6 A (ampere), the duty cycle is 10%. In a case where the cable rated current is 30 A, the duty cycle is 50%. In a case where the cable rated current is 48 A, the duty cycle is 80%. Such a relationship is regulated in the standards on an electric automobile (SAEJ1772) and the like.

In a case where a load equipped in the connector is normally driven with using such a pilot signal CPLT, a time for driving the load is longer with a larger duty cycle. For example, in a case where a light such as a LED is turned on, the light is brighter with a larger duty cycle. However, as shown in FIG. 6, the cable rated current exceeds 30 A in a region where the duty cycle exceeds 50%.

Such a current value is often unused in a case where the vehicle is charged from a receptacle for household use or the like. Since the cable rated current of the receptacle for household use is mainly 20 A or less, it is naturally considered that the duty cycle is less than 50%.

Thus, in the present embodiment, the light emitting diode is directed so as not to be turned on when pilot signal CPLT is at a high level, but to be turned on when pilot signal CPLT is at a low level. In such a way, in a case where the duty cycle of pilot signal CPLT is less than 50%, the light can be turned on to be brighter.

With reference to FIG. 4 again, control pilot circuit 334 turns relay 332 ON when charging preparation is completed on the side of the vehicle.

On the side of the vehicle, a voltage sensor 171 and a current sensor 172 are provided. Voltage sensor 171 detects voltage VAC on a power line pair between charging inlet 270 and LC filter 280, and outputs a detected value thereof to ECU 170. Current sensor 172 detects an electric current IAC flowing through one of a power line pair from DFR 260 to charger 255, and outputs a detected value thereof to ECU 170.

Figure 7:
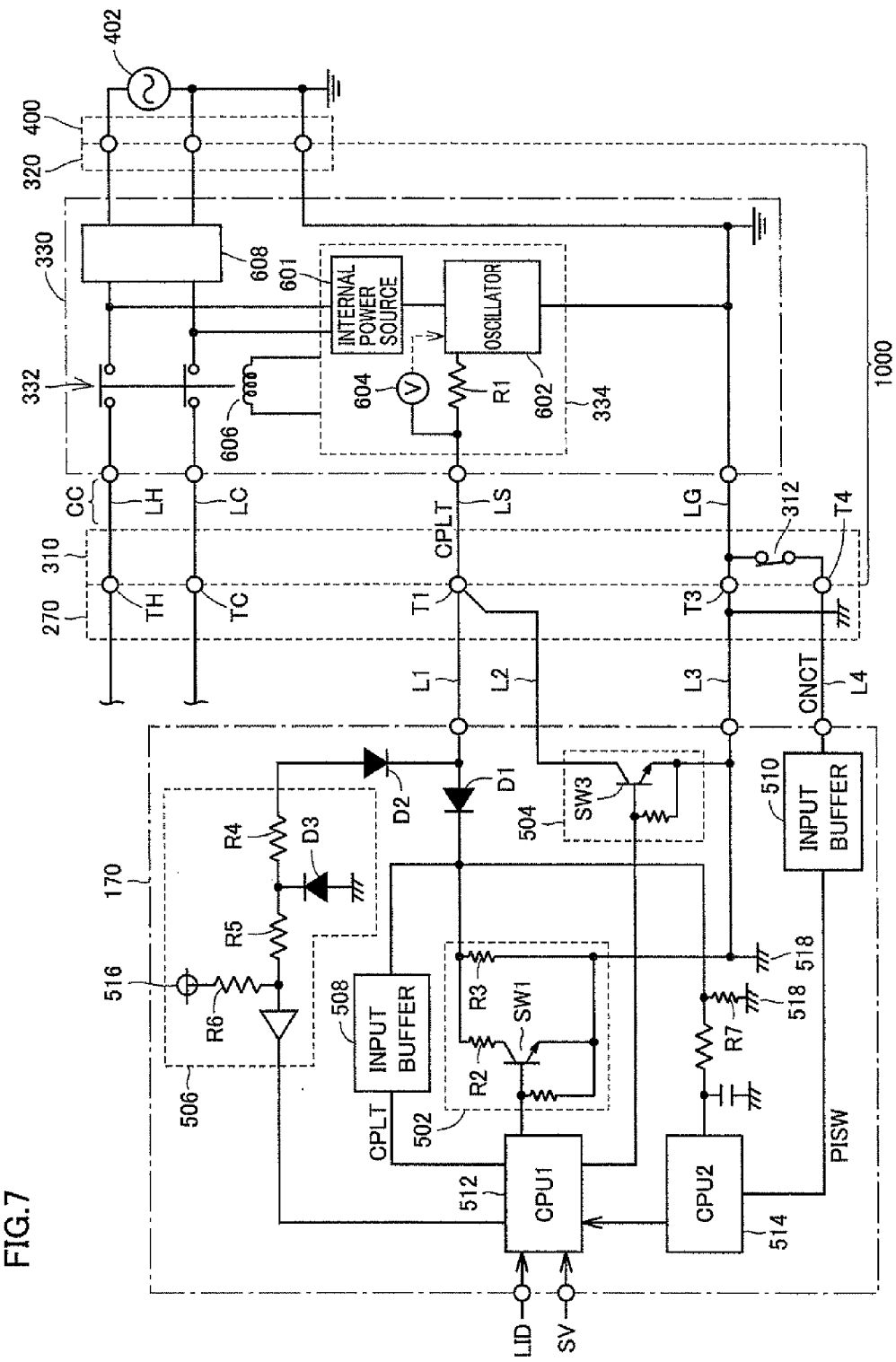
FIG. 7 is a diagram for illustrating the charging mechanism shown in FIG. 4 in more detail.

FIG. 7 is a diagram for illustrating the charging mechanism shown in FIG. 4 in more detail.

With reference to FIG. 7, CCID 330 includes an electromagnetic coil 606, and an electric leakage detector 608 in addition to relay 332 and control pilot circuit 334. Control pilot circuit 334 includes an internal power source 601, an oscillator 602, a resistor element R1, and a voltage detector 604.

Oscillator 602 is actuated by power supply voltage generated by internal power source 601 based on the electric power supplied from power source 402.

FIG. 8 is a table for illustrating an action of oscillator 602.

With reference to FIGS. 7 and 8, oscillator 602 outputs a signal for non-oscillation when the potential of pilot signal CPLT detected by voltage detector 604 is in the vicinity of a specified potential V1 (such as 12±0.6 V), and outputs a signal for oscillation at a specified frequency (such as 1 kHz) by a specified duty cycle when the potential of pilot signal CPLT is decreased from potential V1 to a potential V2 (such as 9±1 V). It should be noted that the potential of pilot signal CPLT is operated by switching a resistance value of a resistance circuit 502 of ECU 170, as described later. As described above, the duty cycle is set based on the rated current suppliable from power source 402 to the vehicle via the charging cable.

Control pilot circuit 334 supplies the electric current to electromagnetic coil 606 when the potential of pilot signal CPLT is in the vicinity of a specified potential V3 (such as 6 V±1 V). When the electric current is supplied from control pilot circuit 334, electromagnetic coil 606 generates electromagnetic force so as to turn relays 332 ON.

Electric leakage detector 608 is provided in a charging cable CC including a power line pair for supplying the charging electric power from power source 402 to the plug-in hybrid vehicle, for detecting electric leakage. Specifically, electric leakage detector 608 detects an equilibrium state of the electric currents flowing through a HOT line LH and a COLD line LC included in charging cable CC in the directions opposite to each other, and also detects generation of the electric leakage when the equilibrium state is broken. It should be noted that although not particularly shown, when the electric leakage is detected by electric leakage detector 608, electric supply to electromagnetic coil 606 is blocked so as to turn relay 332 OFF.

Meanwhile, ECU 170 includes resistance circuit 502, a connection circuit 504, a voltage generation circuit 506, input buffers 508 and 510, and CPUs (Control Processing Units) 512 and 514.

Resistance circuit 502 includes pull-down resistors R2 and R3, and a switch SW1. Pull-down resistor R2 and switch SW1 are connected in series between a control pilot line L1 for communication of pilot signal CPLT and a vehicle ground 518. Pull-down resistor R3 is connected between control pilot line L1 and vehicle ground 518. Pull-down resistor R3 is connected in parallel to pull-down resistor R2 and switch SW1 connected in series. Switch SW1 is turned ON/OFF in accordance with a control signal from CPU 512.

In resistance circuit 502, since switch SW1 is turned ON/OFF in accordance with the control signal from CPU 512, the potential of pilot signal CPLT is switched. That is, when switch SW1 is turned OFF in accordance with the control signal from CPU 512, the potential of pilot signal CPLT is set to be specified potential V2 (such as 9 V) by pull-down resistor R3. When switch SW1 is turned ON in accordance with the control signal from CPU 512, the potential of pilot signal CPLT is set to be specified potential V3 (such as 6 V) by pull-down resistors R2 and R3.

Connection circuit 504 includes a switch SW3. Switch SW3 is connected between a signal line L2 diverged from an input terminal T1 of pilot signal CPLT in charging inlet 270 and a grounding line L3 connected to vehicle ground 518. Switch SW3 is turned ON/OFF in accordance with the control signal from CPU 512.

Connection circuit 504 is provided for detecting disconnection of control pilot line L1 for communication of pilot signal CPLT. That is, when charging connector 310 is not connected to charging inlet 270, voltage divided by pull-up resistors R4 to R6 in voltage generation circuit 506 and a pull-down resistor R7 connected to vehicle ground 518 is generated in control pilot line L1. When the potential of control pilot line L1 is decreased to a grounding level with switch SW3 of connection circuit 504 turned ON, it can be determined that control pilot line L1 is normal. Meanwhile, when the potential of control pilot line L1 is not decreased to the grounding level even with switch SW3 turned ON, it can be determined that control pilot line L1 is disconnected in the vehicle.

It should be noted that when charging connector 310 is connected to charging inlet 270, that is, when power storage devices 150 to 152 of FIG. 3 are charged from power source 402, switch SW3 is turned OFF, so that charging can be controlled with using pilot signal CPLT without exerting an influence over the potential of control pilot line L1 (the potential of pilot signal CPLT). That is, switch SW3 is turned OFF in accordance with the control signal from CPU 512 when charging connector 310 is connected to charging inlet 270, and turned ON in accordance with the control signal from CPU 512 when charging connector 310 is not connected to charging inlet 270.

Voltage generation circuit 506 includes a power supply node 516, pull-up resistors R4 to R6, and a diode D3. When charging connector 310 is not connected to charging inlet 270, voltage generation circuit 506 generates the voltage of power supply node 516 (such as 12 V) and the voltage set by pull-up resistors R4 to R6 and pull-down resistor R7 connected to vehicle ground 518 on control pilot line L1

Input buffer 508 receives pilot signal CPLT of control pilot line L1, and outputs received pilot signal CPLT to CPU 512. Input buffer 510 receives cable connection signal CNCT from a signal line L4 connected to limit switch 312 of charging connector 310, and outputs received cable connection signal CNCT to CPU 514.

It should be noted that the voltage is applied to signal line L4 from ECU 170. When charging connector 310 is connected to charging inlet 270, limit switch 312 is turned ON, so that the potential of signal line L4 is to be the grounding level. That is, cable connection signal CNCT is a signal indicating a L (logic low) level when charging connector 310 is connected to charging inlet 270, and an H (logic high) level when charging connector 310 is not connected to charging inlet 270.

CPU 514 receives cable connection signal CNCT from input buffer 510, and determines whether or not charging connector 310 is connected to charging inlet 270 based on received cable connection signal CNCT. CPU 514 outputs a determination result thereof to CPU 512.

CPU 512 receives pilot signal CPLT from input buffer 508, and also receives from CPU 514 the determination result on whether or not charging connector 310 is connected to charging inlet 270. CPU 512 detects the rated current suppliable from power source 402 to the plug-in hybrid vehicle based on pilot signal CPLT whose oscillation is started in accordance with the connection of charging connector 310 to charging inlet 270.

When the rated current is detected and charging preparation from power source 402 to power storage device 150 is all completed, CPU 512 activates the control signal to be outputted to switch SW1, and turns DFR 260 of FIG. 4 ON. Thereby, the AC electric power from power source 402 is given to neutral point 112 of first MG 110 and neutral point 122 of second MG 120, so that the charging of power storage device 150 is be controlled.

[Configuration of Lighting Part]

In the present embodiment, the light is attached to the charging connector in order to support the charging of the plug-in vehicle at night. Preferably, the light emitting diode can be used as the light. The existing wires are utilized so as to supply the electric power for the light.

FIG. 9 is a schematic view showing an outer appearance of a charging cable unit 1000 of the present embodiment With reference to FIG. 9, charging cable unit 1000 includes plug 320 to be connected to the power source outside of the vehicle, CCID 330, charging cable CC, and charging connector 310. Charging connector 310 has a connection portion 713 to be connected to the vehicle. The light is provided in charging connector 310 so as to illuminate the same direction as the direction of connecting connection portion 713.

Preferably, charging connector 310 is connected to one end of charging cable CC. Plug 320 is connected to the other end of charging cable CC as a connection unit to be connected to the power source. CCID 330 serving as an electric leakage breaker is provided between charging connector 310 and plug 320 on charging cable CC.

A lock button 712 is provided on charging connector 310. A lock mechanism (not shown) is provided so that charging connector 310 once connected to the vehicle is not pulled out even when force is given to pull out charging connector 310. When lock button 712 is pressed, connected charging connector 310 can be separated from the vehicle.

Since the light is provided in connection portion 713 or in the vicinity thereof, the charging connector is easily connected to the vehicle at the time of starting the charging at night.

FIG. 10 is a circuit diagram showing a configuration of charging connector 310 of FIG. 9. FIG. 10 also briefly shows a configuration of CCID 330 for generating pilot signal CPLT for illustration.

With reference to FIG. 10, charging connector 310 includes terminal T1 for outputting pilot signal CPLT to the vehicle, a terminal T3 for providing the grounding level to the vehicle, and a switch 710 for selectively connecting a signal line LS, which transmits pilot signal CPLT from CCID 330 to charging connector 310, to one of terminal T1 and a light emitting diode 700. Switch 710 is switched in working with lock button 712 for fixing charging connector 310 to the vehicle.

Charging connector 310 further includes a resistor 702 and a diode 704 connected in series and in parallel to light emitting diode 700. Light emitting diode 700 is set so as to have the forward direction thereof from the grounding line connected to terminal T3 to switch 710. Meanwhile, diode 704 is connected so as to have the forward direction thereof from switch 710 to the grounding line.

When lock button 712 is pressed, the lock mechanism (not shown) is released, so that charging connector 310 can be removed from the vehicle. In this case, switch 710 is switched so that signal line LS is connected to light emitting diode 700.

Meanwhile, when button 712 is not pressed and charging connector 310 is connected to the vehicle, the lock mechanism is actuated so that charging connector 310 is not removed from the vehicle. In this state, switch 710 is switched so that signal line LS for transmitting signal CPLT is connected to terminal T1.

CCID 330 includes oscillator 602 for outputting a signal (VCPLT1) serving as a source of pilot signal CPLT, resistor R1 connected to the output side of oscillator 602, a capacitor C1 connected between the output side of oscillator 602 and a grounding node, and voltage detector 604.

Voltage detector 604 detects voltage VCLPT2 of signal line LS for transmitting pilot signal CPLT from the CCID to charging connector 310. When switch 710 is selected to be on the side of terminal T1, voltage VCPLT2 is voltage divided by the resistors provided ahead of terminal T1 on the side of the vehicle (combined resistance value of resistors R2 and R3 of FIG. 7) and resistor R1. Meanwhile, when switch 710 is selected to be on the side of light emitting diode 700, voltage detector 604 detects voltage divided by resistor R1 and resistor 702.

Oscillator 602 outputs the value of +12 V at the initial stage. In a case where voltage VCPLT2 is divided to be 6 V or 9 V, oscillator 602 outputs the signal for oscillation between +12 V and −12 V.

When lock button 712 is pressed, voltage VCPLT2 is set to be +9 V by resistor 702. In accordance with this, oscillator 602 outputs the signal for oscillation between +12 V and −12 V. Therefore, light emitting diode 700 is turned on in a period when oscillator 602 outputs the value of −12 V.

Figure 11:
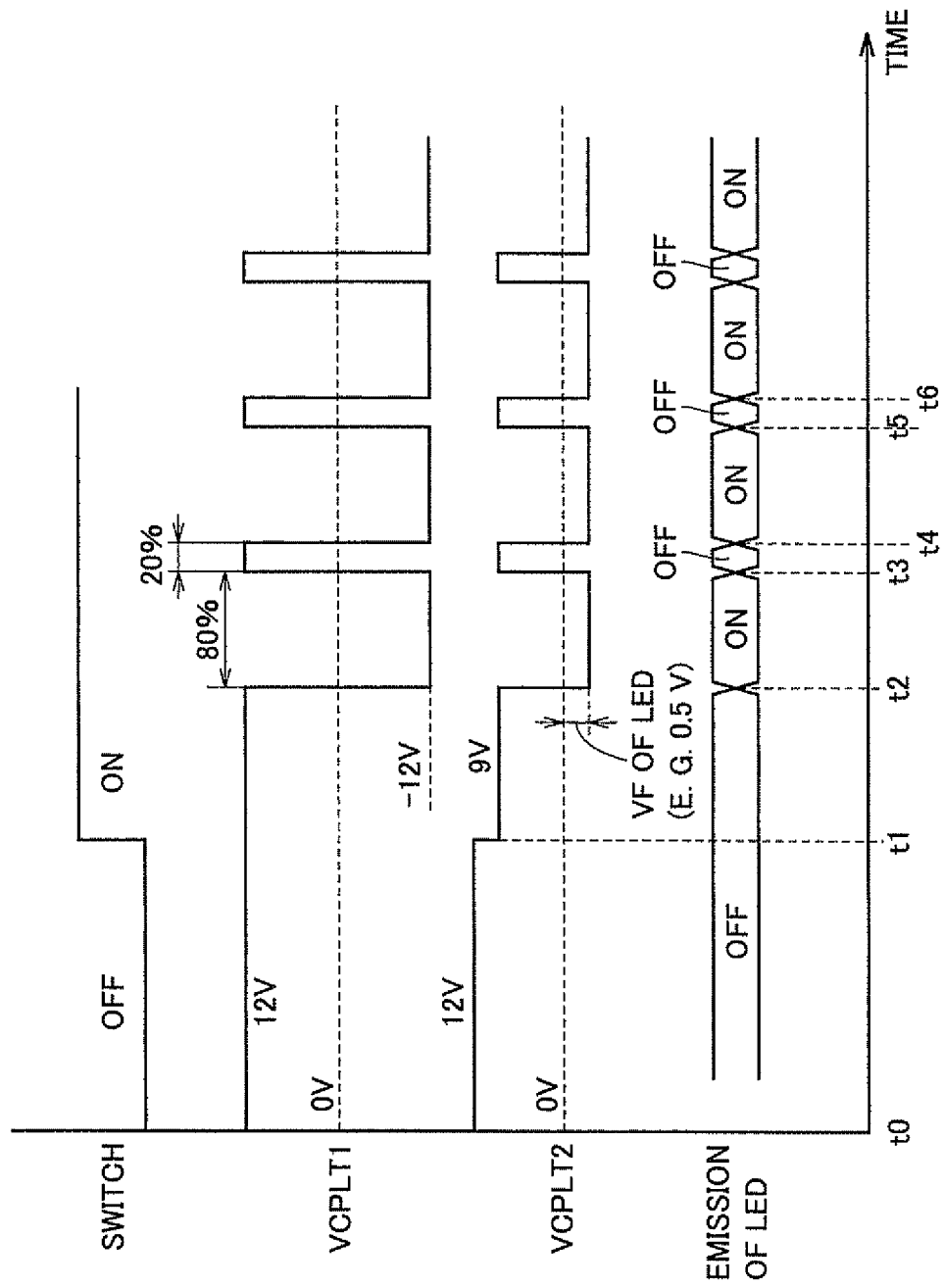
FIG. 11 is an action waveform diagram for illustrating an action of the present embodiment in a case where the cable rated current is 12 A.

FIG. 11 is a waveform diagram for illustrating an action of the present embodiment in a case where the cable rated current is 12 A. It should be noted that the rated current of 12 A is an example, and a cable of a proper rated current is selected in accordance with capacity of the receptacle on the side of the building.

With reference to FIGS. 10 and 11, from time t0 to time t1, button 712 is not pressed and switch 710 is connected to the side of terminal T1 (the term "OFF" describes a state of the switch in FIG. 11). In this case, voltage VCPLT2 outputted from oscillator 602 is 12 V, and voltage VCPLT2 detected by voltage detector 604 is also 12 V.

When button 712 is pressed at time t1 and switch 710 is connected to the side of the load, voltage VCPLT2 is the voltage divided by resistor R1 and resistor 702. For example, in a case where resistor R1 is 1 KΩ and resistor 702 is 3 KΩ, the divided voltage is 9 V. As described in FIG. 8, oscillator 602 starts the oscillation with an amplitude of ±12 V. In this case, the oscillation is performed by the duty cycle of 20% in accordance with the rated current of the cable.

Therefore, voltage VCPLT1 shows a waveform of repeating a low level (−12 V) accounting for 80% and a high level (12 V) accounting for 20% at time t2 and after. At this time, the current flows in the forward direction light emitting diode 700 in a period from time t2 to time t3 when voltage VCPLT2 is lower than 0 V. Therefore, light emitting diode 700 is turned on from time t2 to time t3.

At this time, voltage VCPLT2 takes a value made by subtracting forward voltage VF of the light emitting diode from the grounding line (0 V) connected to terminal T3. For example, in a case where the forward voltage of the light emitting diode is 0.5 V, voltage VCPLT2 is −0.5 V from time t2 to time t3.

From time t3 to time t4, since voltage VCPLT2 takes a positive value, the electric current does not pass through light emitting diode 700. Instead, diode 704 is conducted and voltage VCPLT2 takes a value divided between resistor 702 and resistor R1 (9 V in FIG. 11).

As shown in FIG. 11, since a period when the light emitting diode is turned on is longer than a period when the light emitting diode is turned off, light emitting diode 700 is connected in the direction shown in FIG. 10, so that the light emitting diode is turned on to be brighter than connection in the opposite direction.

Finally, the present embodiment will be summarized with reference to FIG. 10 and the like. The charging connector of the present embodiment is charging connector 310 providing connection between the vehicle and the power source outside of the vehicle for charging the power storage device equipped in the vehicle. The vehicle and the power source are connected to each other at the time of charging by charging cable CC including signal line LS for transmitting pilot signal CPLT for communication of information and the power line for transmitting the electric power. Pilot signal CPLT has the voltage changeable between the high level and the low level having a lower potential than the high level. Charging connector 310 is provided with power terminals (TH, TC of FIG. 7) to be supplied with the electric power from the power line, signal terminal T1 receiving pilot signal CPLT transmitted from signal line LS, and the load having one end coupled to the signal of signal line LS and the other end coupled to a node (T3) of a higher potential than the low level, and including a rectifier element with the forward direction thereof from the other end to the one end.

The load is provided in charging connector 310, serving as the light for illuminating the connection portion provided on the vehicle, and the rectifier element is light emitting diode 700.

Preferably, the charging connector is further provided with lock button 712 for locking the charging connector to the connection portion provided on the vehicle, and switch 710 for connecting signal line LS and the load in accordance with the operation of lock button 712. Lock button 712 is operable in a lock state and a release state, and switch 710 connects signal line LS and the load in the release state, and electrically separates the load from signal line LS in the lock state.

In another aspect of the present embodiment, the present invention may be the charging cable unit provided with the charging connector and the charging cable described above.

Preferably, this charging cable unit is further provided with the connection unit (plug 320 of FIG. 9) to be connected to the power source outside of the vehicle, and a breaker (CCID) provided between the connection unit and charging connector 310 and connected to charging cable CC in series.

More preferably, the breaker includes a signal generating circuit (oscillator 602) for generating pilot signal CPLT, a first resistor element (resistor R1) connected between the output side of the signal generating circuit and signal line LS, and voltage detector 604 for detecting the potential of the high level of signal line LS. Charging connector 310 further includes a second resistor element (resistor 702) connected in parallel to the load, lock button 712 for locking charging connector 310 to the connection portion provided on the vehicle, and switch 710 for connecting signal line LS and the load and the second resistor element connected in parallel in accordance with the operation of lock button 712. Lock button 712 is operable in the lock state and the release state, and switch 710 connects signal line LS and the load in the release state, and electrically separates the load from signal line LS in the lock state.

As described above, when the light emitting diode is turned on with using pilot signal CPLT, it is possible to ensure the power source for the light at low cost without additionally providing a rectifier circuit. The forward direction of the light emitting diode is the direction of illumination in a case where pilot signal CPLT is at minus level so as not to exert an influence over the voltage to be detected by the voltage detection circuit. Thus, it is possible to easily change the type or the number of the LED.

The embodiments disclosed herein should be regarded as not limitation but an example in all aspects. A scope of the present invention is shown by not the description above but claims. The present invention should include all variations within similar meanings and ranges to the claims.

Description of The Reference Signs

100 Engine, 112, 122 Neutral point, 130 Power split device, 140 Speed reducer, 150, 151, 152 Power storage device, 160 Drive wheel, 170 ECU, 171 Voltage sensor, 172 Current sensor, 200, 201, 202 Converter, 210, 220 Inverter, 250, 251, 252 SMR, 255 Charger, 260 DFR, 270 Charging inlet, 280 LC filter, 290 Charging lid detector, 292 Speed detector, 300 Charging cable, 310 Charging connector, 312 Limit switch, 320 Plug, 330 CCID, 332 Relay, 334 Control pilot circuit, 400 Power supply receptacle, 402 Power source, 502 Resistance circuit, 504 Connection circuit, 506 Voltage generation circuit, 508, 510 Input buffer, 512, 514 CPU, 516 Power supply node, 518 Vehicle ground, 601 Internal power source, 602 Oscillator, 604 Voltage detector, 606 Electromagnetic coil, 608 Electric leakage detector, 700 Light emitting diode, 702 Resistor, 704, D3 Diode, 710 Switch, 712 Lock button, 713 Connection portion, 1000 Charging cable unit, C1 Capacitor, CC Charging cable, L1 Control pilot line, L2, L4, LS Signal line, L3 Grounding line, LC COLD line, LH HOT line, R1 Resistor, R2, R3, R7 Pull-down resistor, R4 Pull-up resistor, SW1, SW3 Switch, T1, T3 Terminal

The invention claimed is:

1. A charging connector providing connection between a vehicle and a power source outside of said vehicle for charging a power storage device provided in the vehicle, said vehicle and said power source being connected to each other at a time of charging by a charging cable including a signal line for transmitting a pilot signal for communication of information and a power line for transmitting electric power, said pilot signal having a voltage changeable between a high level and a low level having a lower potential than said high level, said charging connector comprising:

a power terminal to be supplied with the electric power from said power line;

a signal terminal receiving said pilot signal transmitted from said signal line; and a load having a first end electrically coupled to said signal line and a second end electrically coupled to a node having a higher potential than said low level, the load including a rectifier element having a forward direction thereof from said second end to said first end.

2. The charging connector according to claim 1, wherein said load is provided in said charging connector and serves as a light for illuminating a connection portion provided on said vehicle, and said rectifier element is a light emitting diode.

3. The charging connector according to claim 1, further comprising:

an operation unit for operating a lock between said charging connector and the connection portion provided on said vehicle; and a switch for connecting said signal line and said load in accordance with the operation of said operation unit, wherein said operation unit is selectively operable in a lock state and in a release state, and said switch (i) connects said signal line and said load when the operation unit is in said release state, and (ii) electrically separates said load from said signal line when the operation unit is in said lock state.

4. A charging cable unit providing connection between a vehicle and a power source outside of said vehicle for charging a power storage device provided in the vehicle, the charging cable unit comprising:

a charging cable including a signal line for transmitting a pilot signal for communication of information and a power line for transmitting electric power, the charging cable providing connection between said vehicle and said power source at a time of charging, said pilot signal having a voltage changeable between a high level and a low level having a lower potential than said high level; and a charging connector connected to one end of said charging cable, the charging connector being connectable to a connection portion provided on the vehicle, said charging connector including:
a power terminal to be supplied with the electric power from said power line;
a signal terminal receiving said pilot signal transmitted from said signal line; and
a load having a first end electrically coupled to said signal line and a second end electrically coupled to a node having a higher potential than said low level, the load including a rectifier element having a forward direction thereof from said second end to said first end.

5. The charging cable unit according to claim 4, wherein said load is provided on said charging connector and serves as a light for illuminating said connection portion provided on said vehicle, and
said rectifier element is a light emitting diode.

6. The charging cable unit according to claim 5, further comprising:
a connection unit to be connected to said power source outside of said vehicle; and
a breaker provided between said connection unit and said charging connector and connected to said charging cable in series.

7. The charging cable unit according to claim 6, wherein said breaker includes:
a signal generating circuit generating said pilot signal;
a first resistor element connected between an output side of said signal generating circuit and said signal line; and
a voltage detector for detecting a potential of the high level of said signal line,
said charging connector further includes:
a second resistor element connected in parallel to said load;
an operation unit for operating a lock between said charging connector and the connection portion provided on said vehicle; and
a switch for connecting said signal line and said load and said second resistor element connected in parallel in accordance with the operation of said operation unit,
said operation unit is selectively operable in a lock state and in a release state, and
said switch (i) connects said signal line and said load when the operation unit is in said release state, and (ii) electrically separates said load from said signal line when the operation unit is in said lock state.

8. The charging connector according to claim 1, further comprising:
a switch that selectively couples the signal line to (a) the load and (b) the signal terminal, wherein
the switch (i) connects the signal line to the load and electrically separates the signal line from the signal terminal in a first state, and (ii) electrically separates the load from the signal line and connects the signal line to the signal terminal in a second state.

9. The charging cable unit according to claim 4, further comprising:
a switch that selectively couples the signal line to (a) the load and (b) the signal terminal, wherein
the switch (i) connects the signal line to the load and electrically separates the signal line from the signal terminal in a first state, and (ii) electrically separates the load from the signal line and connects the signal line to the signal terminal in a second state.

10. The charging connector according to claim 1, wherein
the high level has a higher potential than 0 volts, and
the low level has a lower potential than 0 volts.

11. The charging cable unit according to claim 4, wherein
the high level has a higher potential than 0 volts, and
the low level has a lower potential than 0 volts.

12. The charging connector according to claim 1, wherein
an electric current passes through the load when the pilot signal has the low level.

13. The charging cable unit according to claim 4, wherein
an electric current passes through the load when the pilot signal has the low level.

14. The charging cable unit according to claim 4, wherein the charging cable includes:
a control pilot circuit that generates a pilot signal CPLT and oscillates the pilot signal CPLT by a specified duty cycle that is less than 50%.

* * * * *